(12) United States Patent
Soucy et al.

(10) Patent No.: US 6,575,540 B2
(45) Date of Patent: Jun. 10, 2003

(54) RUBBER-BAND TRACK WITH VARIOUS HARDNESS

(75) Inventors: Gilles Soucy, Drummondville (CA); Yves St-Pierre, Wickham (CA); André Deland, Drummondville (CA)

(73) Assignee: Soucy International Inc., Drummondville (CA)

( * ) Notice: Subject to any disclaimer, the term of this patent is extended or adjusted under 35 U.S.C. 154(b) by 0 days.

(21) Appl. No.: 09/954,537

(22) Filed: Sep. 18, 2001

(65) Prior Publication Data

US 2002/0145335 A1 Oct. 10, 2002

(30) Foreign Application Priority Data

Sep. 18, 2000 (CA) ............................................. 2319934

(51) Int. Cl.[7] ............................................... B62D 55/24
(52) U.S. Cl. ........................ 305/166; 305/165; 305/167
(58) Field of Search ................................. 305/165, 166, 305/167, 168, 160, 169, 174, 178, 179, 180, 181, 19; 152/209.5, 209.7, 170, 185.1, 185

(56) References Cited

U.S. PATENT DOCUMENTS

| D210,938 S | * | 5/1968 | Klapmeier | 305/168 |
|---|---|---|---|---|
| 3,416,845 A | * | 12/1968 | Scanland | 305/179 |
| 3,451,729 A | * | 6/1969 | Roy | 305/168 |
| 3,622,209 A | * | 11/1971 | Leyden | 305/179 |
| 3,799,627 A | * | 3/1974 | Zwieg | 305/165 |
| 3,917,360 A | * | 11/1975 | Gregoire | 305/168 |
| 4,217,006 A | | 8/1980 | Dehnert | |
| 4,474,414 A | * | 10/1984 | Tokue | 305/168 |
| 5,174,638 A | * | 12/1992 | Tokue et al. | 305/166 |
| 5,713,645 A | | 2/1998 | Thompson et al. | |
| 5,730,510 A | * | 3/1998 | Courtemanche | 305/168 |
| 6,422,665 B1 | * | 7/2002 | Courtemanche | 305/168 |

FOREIGN PATENT DOCUMENTS

JP 11192982 7/1999

* cited by examiner

Primary Examiner—S. Joseph Morano
Assistant Examiner—Long Bao Nguyen
(74) Attorney, Agent, or Firm—Robert Brouillette; Ronald S. Kosie; Gaétan Prince

(57) ABSTRACT

The endless track is made of a reinforced rubber material with longitudinally spaced and transversely disposed ridges or lugs. It is particularly well-adapted for recreational snowmobiles having a single track. The track is characterized in that the rubber material of the central portion of the body has a hardness of between 75 and 90 duro A while the rubber material of the opposite band portions of the body has a hardness between 55 and 75 duro A. Such track facilitates the steering capabilities of a snowmobile, particularly when the snowmobile is traveling on hard and abrasive surfaces. It also improves the durability of the track.

16 Claims, 1 Drawing Sheet

RUBBER-BAND TRACK WITH VARIOUS HARDNESS

Figure 1:
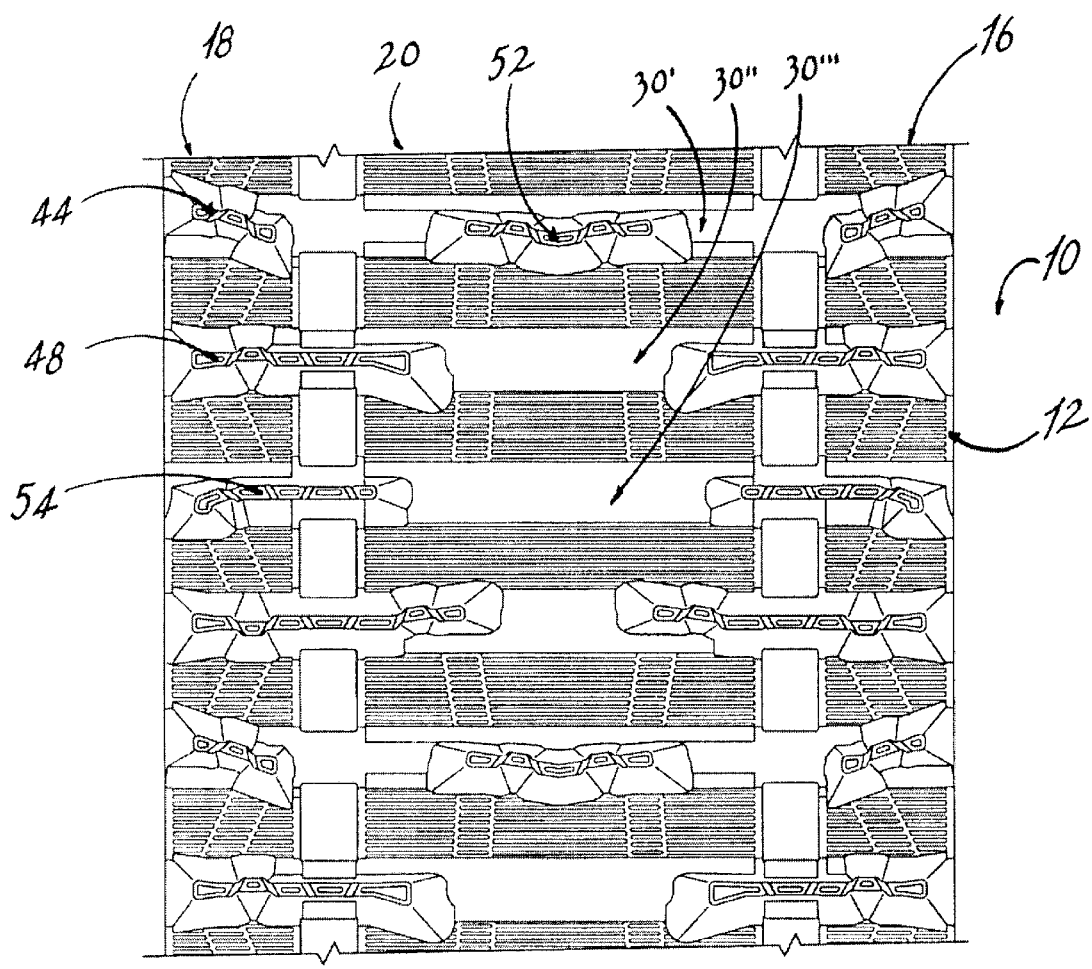

The present invention relates to an endless track for a vehicle in which the rubber material of the longitudinally extending central portion of the external side of the track profile has a higher hardness than that of opposite lateral band portions thereof. More particularly, the present invention relates to a track which is particularly well suited for a vehicle having a single track, such as a conventional recreational snowmobile.

A rubber-band track is found on off-road motor driven vehicles which are designed to travel on snow or grounds that could not adequately support wheels or on which traction forces could not be suitably applied with the use of wheels. A rubber-band track typically consists essentially of an endless band of a molded rubber material that is flexible around a transversal axis so as to follow the curvature around drive and idler sprocket wheels. Each track is designed to support a portion of the weight of the vehicle and apply a traction force on the ground.

Among all off-road vehicles equipped with rubber-band tracks, recreational snowmobiles are unique in that they are equipped with only one track while essentially all other vehicles are equipped with two or more tracks. Examples of such other vehicles are bulldozers, military tanks, snow-surfacing machines, etc. Tracks for vehicles with a single track, which are essentially snowmobiles, are the prime interest of the present invention.

A snowmobile is often equipped with a rubber-band track that features an endless body made of a reinforced rubber material with longitudinally spaced and transversely disposed stiffeners embedded in the rubber material. The body defines a longitudinally extending central portion and a pair of lateral band portions each of which is located on one of the sides of the central portion. The track is positioned under the chassis of the snowmobile and supports most of the weight. A pair of front ski-like runners are provided to steer the snowmobile and support the other portion of the weight.

The body of the track has a ground-engaging outer side and an inner side. The inner side cooperates with a suspension system. The weight of the track is supported by either a pair of slide rails or a plurality of bogey wheels that are mechanically connected to the other parts of the suspension system. The suspension system is also used to support the track with respect to lateral movements.

The ground-engaging outer side has a tread pattern that is repeated uniformly or not over the entire length of the track. The tread pattern comprises a plurality of projecting traction lugs that are configured and disposed in accordance with the purpose for which the track is designed. The traction lugs are used to increase the traction of the snowmobile on snow, mud, melting snow, ice or any other similar surfaces.

Further, the opposite lateral band portions are separated from the central portion by a corresponding row of holes. Each row of holes generally cooperates with the teeth of a corresponding pair of drive and idler sprocket wheels. Alternatively, the drive and idler sprocket wheels may engage driving lugs that are inwardly projecting from the inner side of the track.

Formerly, the material used for forming all portions of the outer side tread had essentially the same hardness value. Choosing the right hardness value was then a compromise between the requirements of preventing the track from deforming excessively during acceleration and allowing the track to bend in various situations. Since the need to prevent the track to deform is of paramount importance, a conventional track is generally hard and stiff, thereby resisting bending. This leads to a number of drawbacks. One of them is that a snowmobile is not easy to turn on hard surfaces, especially hard surfaces with which the track has an important friction level. When turning the snowmobile on such surfaces, the traction lugs of the sides of the track are subjected to an intense abrasion and to substantial stress concentrations. Since the body of the track cannot be easily deformed, the traction lugs take most of the stresses, subjecting them to a premature wear over time. Moreover, this creates unpleasant driving situations to the driver.

The general steering capabilities of a snowmobile may be improved when the driver offsets his/her weight on the side of the snowmobile. This forces the track to bend and it shifts the position of the center of rotation to a more appropriate location. However, considering the weight of some snowmobiles on the market and the fact that some drivers are not heavy enough or are not interested in or capable of performing such movements, there is a need for an improved track which facilitates the general steering capabilities of a snowmobile.

SUMMARY

One aspect of the present invention is to facilitate the steering capabilities of a snowmobile, particularly when the snowmobile is traveling on a hard surface, by providing a track in which the rubber material on the outer side tread of the lateral band portions has a lower hardness value than that of the rubber material on the outer side tread of the central portion so as to allow the track to bend more easily during a sharp turn while still being rigid enough at the center for maintaining a good traction during an acceleration.

Another aspect of the present invention is to improve the durability of the track by allowing the track to bend more easily and lower the stresses subjected to the traction lugs.

These and other aspects and advantages of the present invention are described in or apparent from the following detailed description of a preferred embodiment made in conjunction which the apparent figures.

BRIEF DESCRIPTION OF THE SINGLE FIGURE

FIG. 1 is a plan view of an example of a track according to a preferred embodiment of the present invention.

DETAILED DESCRIPTION

A track (10) according to a possible and preferred embodiment of the present invention is described hereinafter and illustrated in the appended figure.

As shown in FIG. 1, the track (10) comprises an endless body (12) made of a rubber material with longitudinally spaced and transversely disposed ridges in which stiffeners (not shown) may be or not embedded in the rubber material. The body defines a longitudinally extending central ridges in which portion (20) and a pair of opposite lateral band portions (16,18) each of which is located on one side of the central portion (20).

The body (12) of the track (10) has a ground-engaging outer side that is provided with a tread pattern (30', 30", 30'''). The tread pattern (30', 30", 30''') is repeated uniformly or not over the entire length of the track (10). The tread pattern (30', 30", 30''') comprises a plurality of projecting traction lugs (44, 48, 52, 54) disposed on the central portion (20), on the lateral band portions (16,18) or both. The traction lugs typically have between ¾ and 3 inches in lateral length. The width of the central portion (20) is typically in the range of 5 to 10 inches, with a preferred value of 6½ inches when the total width of the track (10) is 15 inches.

In accordance with the present invention, the track (10) is characterized in that the rubber material of the central portion (20) has an average hardness of between about 75 and about 90 duro A, while the the rubber material of the lateral band portions (16,18) has an average hardness of between about 55 and about 75 duro A. The preferred value of the average hardness of the central portion (20) is about 80 duro A, while the preferred value of the average hardness of the lateral band portions (16,18) is about 60 duro A.

Although a preferred embodiment of the invention has been described in detail herein and illustrated in the accompanying figure, it is to be understood that the invention is not limited to this precise embodiment and that various changes and modifications may be effected therein without departing from the scope or spirit of the present invention.

What is claimed is:

1. An endless track for a vehicle, the track having an endless body made of a reinforced rubber material, the body having a ground-engaging outer side on which are disposed a plurality of ridges or lugs, and an inner side, the body defining a longitudinally extending central portion and two lateral band portions each of which is located on a different side of the central portion, the track being characterized in that:

the rubber material of the central portion of the body has a hardness which is greater than the hardness of the rubber material of the lateral band portions of the body.

2. An endless track according to claim 1, characterized in that the rubber material of the central portion of the body has an average hardness of between about 75 and about 90 duro A.

3. An endless track according to claim 1, characterized in that the rubber material of the central portion of the body has an average hardness of about 80 duro A.

4. An endless track according to claim 1, characterized in that the rubber material of each band portion of the body has an average hardness of between about 55 and about 75 duro A.

5. An endless track according to claim 1, characterized in that the rubber material of each band portion of the body has an average hardness of about 60 duro A.

6. An endless track for a vehicle, the track having an endless body made of a reinforced rubber material, the body having a ground-engaging outer side on which are disposed a plurality of ridges or lugs, and an inner side, the body defining a longitudinally extending central portion and two lateral band portions each of which is located on a different side of the central portion, the track being characterized in that:

the rubber material of the central portion of the body has a hardness of between about 75 and about 90 duro A and the rubber material of the lateral band portion of the body has a hardness which is lesser than that of the central portion of the body and is between about 55 and about 75 duro A.

7. An endless track for a vehicle, the track having an endless body made of a reinforced rubber material, the body having a ground-engaging outer side on which are disposed a plurality of ridges or lugs, and an inner side, the body defining a longitudinally extending central portion and two lateral band portions each of which is located on one side of the central portion, the track being characterized in that:

the rubber material of the central portion of the body has a hardness of about 80 duro A and the rubber material of the lateral band portion of the body has a hardness of about 60 duro A.

8. An endless track described in claim 2, characterized in that the rubber material of the lateral band portions of the body has an average hardness of between about 55 and about 75 duro A.

9. An endless track as described in claim 3, characterized in that the rubber material of the lateral band portions of the body has an average hardness of about 60 duro A.

10. An endless track as described in claim 1, wherein the vehicle is a snowmobile.

11. An endless track as described in claim 2, wherein the vehicle is a snowmobile.

12. An endless track as described in claim 3, wherein the vehicle is a snowmobile.

13. An endless track as described in claim 4, wherein the vehicle is a snowmobile.

14. An endless track as described in claim 5, wherein the vehicle is a snowmobile.

15. An endless track as described in claim 8, wherein the vehicle is a snowmobile.

16. An endless track as described in claim 9, wherein the vehicle is a snowmobile.

* * * * *